United States Patent
Noh et al.

(10) Patent No.: US 10,257,857 B2
(45) Date of Patent: Apr. 9, 2019

(54) APPARATUS AND METHODS FOR TXOP DURATION FIELD IN PHY HEADER

(71) Applicant: NEWRACOM, Inc., Irvine, CA (US)

(72) Inventors: Yujin Noh, Irvine, CA (US); Yongho Seok, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 0 days.

(21) Appl. No.: 15/278,597

(22) Filed: Sep. 28, 2016

(65) Prior Publication Data

US 2017/0094685 A1 Mar. 30, 2017

Related U.S. Application Data

(60) Provisional application No. 62/240,454, filed on Oct. 12, 2015, provisional application No. 62/233,881, filed on Sep. 28, 2015.

(51) Int. Cl.
*H04B 7/06* (2006.01)
*H04L 5/00* (2006.01)
(Continued)

(52) U.S. Cl.
CPC ..... *H04W 74/0816* (2013.01); *H04L 27/0006* (2013.01); *H04W 72/042* (2013.01);
(Continued)

(58) Field of Classification Search
CPC ..... H04B 7/0663; H04L 27/262; H04L 69/22; H04W 48/20; H04W 72/042; H04W 74/0816; H04W 84/12
See application file for complete search history.

(56) References Cited

U.S. PATENT DOCUMENTS 7,447,185 B2 * 11/2008 Trainin ................. H04W 99/00
370/331
7,616,655 B2 * 11/2009 Benveniste ........... H04W 74/00
370/322

(Continued)

FOREIGN PATENT DOCUMENTS

WO 2011025145 A2 3/2011

OTHER PUBLICATIONS

International Search Report and Written Opinion for Application No. PCT/US2016/054185, dated Jan. 27, 2017, 10 pages.
(Continued)

*Primary Examiner* — Asad M Nawaz
*Assistant Examiner* — Kai Chang
(74) *Attorney, Agent, or Firm* — Nicholson De Vos Webster & Elliott LLP

(57) ABSTRACT

A method is implemented by a station (STA) in a Wireless Local Area Network (WLAN) to update a Network Allocation Vector (NAV) maintained by the STA. The method includes receiving a first Physical Layer Protocol Data Unit (PPDU), determining whether a duration indicated in a control field of a preamble portion of the first PPDU is greater than a current NAV value, determining whether the first PPDU is received as an immediate response to a second PPDU previously transmitted by the STA, and updating the NAV maintained by the STA using the duration in response to a determination that the duration is greater than the current NAV value and the first PPDU is not received as an immediate response to the second PPDU previously transmitted by the STA.

14 Claims, 12 Drawing Sheets

(51) Int. Cl.
*H04L 27/00* (2006.01)
*H04L 27/26* (2006.01)
*H04L 29/06* (2006.01)
*H04W 48/20* (2009.01)
*H04W 72/04* (2009.01)
*H04W 74/08* (2009.01)
*H04W 84/12* (2009.01)

(52) U.S. Cl.
CPC .......... *H04B 7/0663* (2013.01); *H04L 5/0023* (2013.01); *H04L 5/0091* (2013.01); *H04L 27/262* (2013.01); *H04L 27/2613* (2013.01); *H04L 69/22* (2013.01); *H04W 48/20* (2013.01); *H04W 84/12* (2013.01)

(56) References Cited

U.S. PATENT DOCUMENTS

| | | | | |
|---|---|---|---|---|
| 8,971,350 | B1 | 3/2015 | Liu | |
| 9,350,428 | B2* | 5/2016 | Kang | H04B 7/0452 |
| 9,917,679 | B2* | 3/2018 | Seok | H04L 5/0055 |
| 2003/0123405 | A1 | 7/2003 | Del et al. | |
| 2005/0249244 | A1* | 11/2005 | McNamara | H04L 1/0025 |
| | | | | 370/474 |
| 2006/0045035 | A1* | 3/2006 | Liu | H04W 52/0229 |
| | | | | 370/311 |
| 2007/0002887 | A1* | 1/2007 | Benveniste | H04W 74/00 |
| | | | | 370/437 |
| 2007/0127428 | A1* | 6/2007 | Lee | H04W 8/26 |
| | | | | 370/338 |
| 2007/0160021 | A1* | 7/2007 | Xhafa | H04W 74/04 |
| | | | | 370/338 |
| 2007/0171933 | A1* | 7/2007 | Sammour | H04W 74/0816 |
| | | | | 370/447 |
| 2008/0112351 | A1* | 5/2008 | Surineni | H04W 74/0816 |
| | | | | 370/312 |
| 2011/0043340 | A1* | 2/2011 | Kim | H04B 3/542 |
| | | | | 375/260 |
| 2014/0133408 | A1* | 5/2014 | Wentink | H04L 1/0061 |
| | | | | 370/329 |
| 2014/0185557 | A1* | 7/2014 | Yang | H04W 74/0816 |
| | | | | 370/329 |
| 2014/0327579 | A1* | 11/2014 | Hart | G01S 3/48 |
| | | | | 342/374 |
| 2014/0328270 | A1* | 11/2014 | Zhu | H04W 74/002 |
| | | | | 370/329 |
| 2015/0110093 | A1* | 4/2015 | Asterjadhi | H04W 74/08 |
| | | | | 370/338 |
| 2015/0249529 | A1 | 9/2015 | Zheng et al. | |
| 2015/0382216 | A1* | 12/2015 | Tian | H04W 24/08 |
| | | | | 370/252 |
| 2016/0113009 | A1* | 4/2016 | Seok | H04B 7/0452 |
| | | | | 370/329 |
| 2016/0127233 | A1* | 5/2016 | Wentink | H04W 72/1289 |
| | | | | 370/392 |
| 2016/0128048 | A1* | 5/2016 | Tian | H04W 72/0406 |
| | | | | 370/329 |
| 2016/0128057 | A1* | 5/2016 | Seok | H04L 5/0055 |
| | | | | 370/329 |
| 2016/0316458 | A1* | 10/2016 | Kwon | H04L 27/2601 |
| 2016/0330788 | A1* | 11/2016 | Zheng | H04W 28/0205 |
| 2017/0064739 | A1* | 3/2017 | Hedayat | H04W 74/0816 |
| 2017/0127352 | A1* | 5/2017 | Park | H04W 52/0225 |
| 2017/0208625 | A1* | 7/2017 | Choi | H04W 74/0808 |
| 2017/0289987 | A1* | 10/2017 | Seok | H04W 74/00 |
| 2017/0295560 | A1* | 10/2017 | Kim | H04W 72/02 |

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.
IEEE Std 802.11a-1999: "Part 11: Wireless LAN Medium Access Control (MAC) and Physical Layer (PHY) Specifications, Highspeed Physical Layer in the 5 GHz Band," IEEE Standard for Information technology—Telecommunications and information exchange between systems, Local and metropolitan area networks—Specific equirements, reaffirmed Jun. 12, 2003, 91 pages.
IEEE Std 802.11ac-2013: "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.
IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific equirements, Mar. 2015, 632 pages.
IEEE Std 802.11g-2003: "Part 11: Wireless LAN Medium Access Control (MAC) and Physical Layer (PHY) Specifications, Amendment 4: Further Higher Data Rate Extension in the 24 GHz Band," IEEE Standard for Information technology—Telecommunications and information exchange between systems, Local and metropolitan area networks—Specific requirements, Jun. 27, 2003, 78 pages.
IEEE Std 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.
Invitation to Pay Additional Fees for Application No. PCT/US2016/054185, dated Nov. 22, 2016, 2 pages.
International Preliminary Report on Patentability for Application No. PCT/US2016/054185, dated Apr. 12, 2018, 7 pages.

* cited by examiner

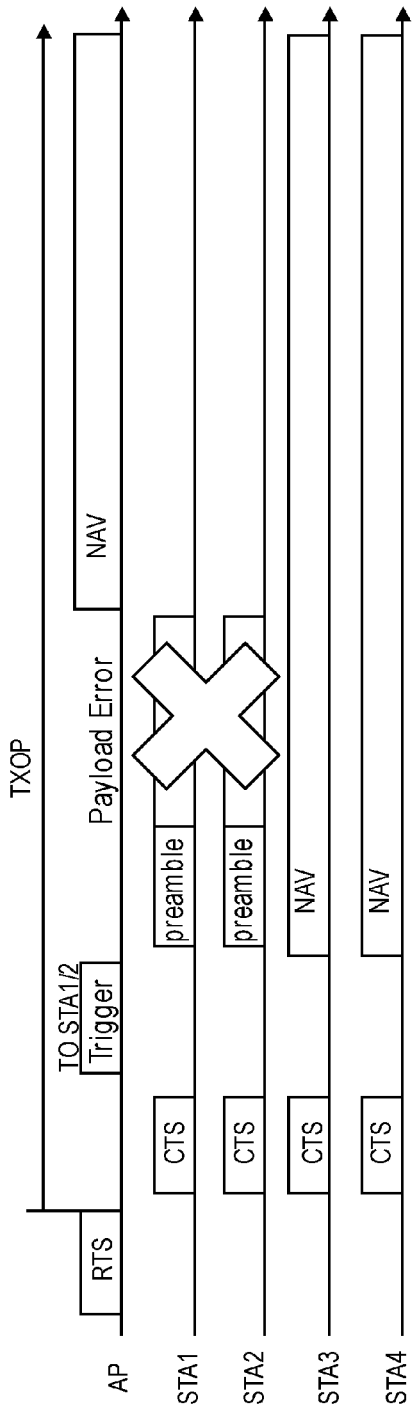
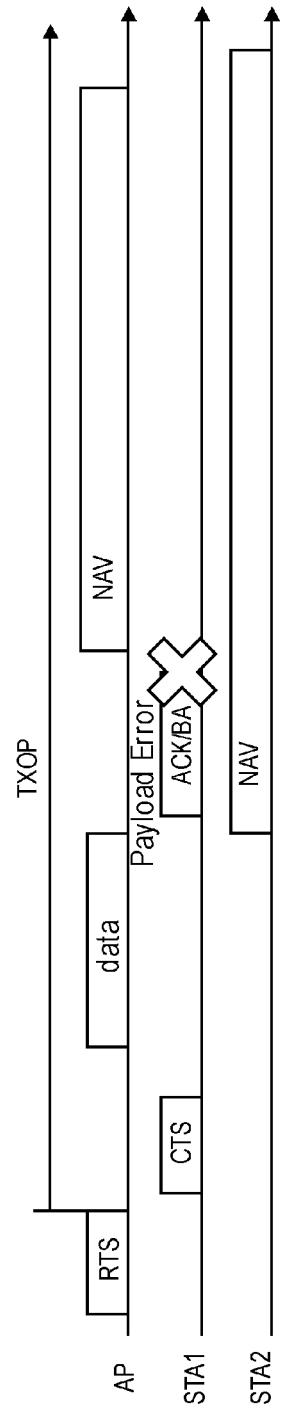
FIG. 2A
FIG. 2B

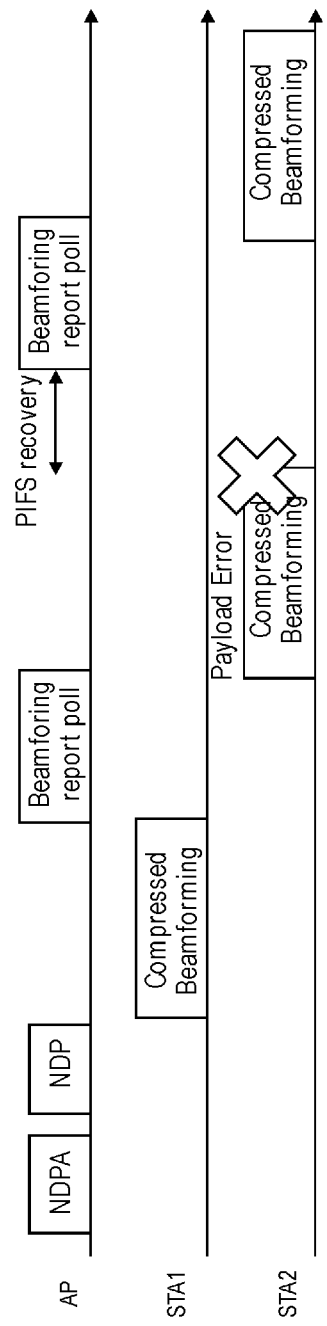
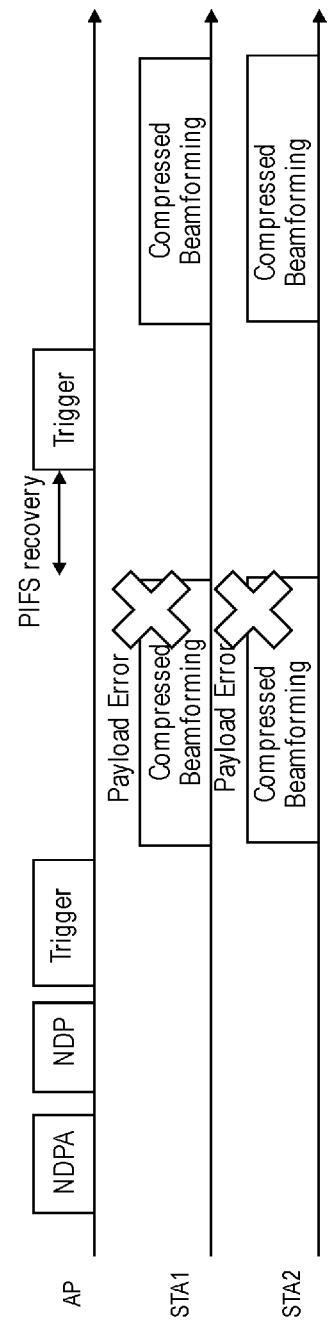
FIG. 3C
FIG. 3D

APPARATUS AND METHODS FOR TXOP DURATION FIELD IN PHY HEADER

CROSS-REFERENCE TO RELATED APPLICATIONS

This application claims the benefit of U.S. Provisional Application No. 62/233,881, filed Sep. 28, 2015 and U.S. Provisional Application No. 62/240,454, filed Oct. 12, 2015, which are hereby incorporated by reference.

FIELD OF INVENTION

The embodiments described herein related to the field of Wireless Local Area Network (WLAN) operation. More specifically, the embodiments described herein relate to the maintenance and use of Network Allocation Vector (NAV) in a High Efficiency (HE) Wireless Local Area Network (WLAN). Other embodiments are also disclosed.

BACKGROUND

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

A WLAN device typically employs a carrier sense mechanism to determine whether it can transmit data over a wireless medium. The distributed nature of 802.11 WLANs makes the carrier sense mechanism very important for reducing the amount of collisions in the WLAN. The physical carrier sense mechanism of a WLAN device is responsible for detecting transmissions of other WLAN devices. However, it may be impossible for a WLAN device to detect all of the transmissions that may collide with its own transmission. For example, a WLAN device which is a long distance away from another WLAN device that is transmitting data may determine that the wireless medium is idle and begin transmitting data as well. To overcome such hidden node problems, a Network Allocation Vector (NAV) has been introduced. NAV maintains a prediction of future traffic on the wireless medium based on duration information captured from Physical Layer Protocol Data Units (PPDUs).

In a task group called Institute of Electrical and Electronics Engineers (IEEE) 802.11ax, High Efficiency WLAN (HEW) standardization is under discussion. The HEW aims at improving performance felt by users demanding high-capacity and high-rate services. The HEW may support uplink (UL) and downlink (DL) multi-user (MU) simultaneous transmissions, which includes Multi-User Multiple-Input Multiple-Output (MU-MIMO) and Orthogonal Frequency Division Multiple Access (OFDMA) transmissions. The HEW may also support new Clear Channel Assessment (CCA) levels and deferral rules to improve Overlapping Basic Service Set (OBSS) operation in dense environments. Employing existing NAV techniques in the HEW may result in unintended inefficiencies.

SUMMARY

A method is implemented by a station (STA) in a Wireless Local Area Network (WLAN) to update a Network Allocation Vector (NAV) maintained by the STA. The method includes receiving a first Physical Layer Protocol Data Unit (PPDU), determining whether a duration indicated in a control field of a preamble portion of the first PPDU is greater than a current NAV value, determining whether the first PPDU is received as an immediate response to a second PPDU previously transmitted by the STA, and updating the NAV maintained by the STA using the duration indicated in the control field of the preamble portion of the first PPDU in response to a determination that the duration indicated in the control field of the preamble portion of the first PPDU is greater than the current NAV value and the first PPDU is not received as an immediate response to the second PPDU previously transmitted by the STA.

A method is implemented by a station (STA) in a Wireless Local Area Network (WLAN) to disregard a Network Allocation Vector (NAV) maintained by the STA. The method includes receiving a first Physical Layer Protocol Data Unit (PPDU) from an Access Point (AP), where the first PPDU elicits an immediate response from the STA, determining whether the NAV maintained by the STA was previously set using a duration indicated in a second PPDU that originated from a same Basic Service Set (BSS) as a BSS that the STA is associated with, and transmitting a third PPDU to the AP as an immediate response to the first PPDU without regard for the NAV maintained by the STA in response to a determination that the NAV maintained by the STA was previously set using the duration indicated in the second PPDU.

A network device configured to function as a station (STA) in a Wireless Local Area Network (WLAN) to update a Network Allocation Vector (NAV) maintained by the STA. The network device includes a Radio Frequency (RF) transceiver, a set of one or more processors, and a non-transitory machine-readable storage medium having stored therein a NAV component. The NAV component, when executed by the set of one or more processors, causes the network device to receive a first Physical Layer Protocol Data Unit (PPDU), determine whether a duration indicated in a control field of a preamble portion of the first PPDU is greater than a current NAV value, determine whether the first PPDU is received as an immediate response to a second PPDU previously transmitted by the STA, and update the NAV maintained by the STA using the duration indicated in the control field of the preamble portion of the first PPDU in response to a determination that the duration indicated in the control field of the preamble portion of the first PPDU is greater than the current NAV value and the first PPDU is not received as an immediate response to the second PPDU previously transmitted by the STA.

A network device configured to function as a station (STA) in a Wireless Local Area Network (WLAN) to disregard a Network Allocation Vector (NAV) maintained by the STA. The network device includes a Radio Frequency (RF) transceiver, a set of one or more processors, and a non-transitory machine-readable storage medium having stored therein a NAV component. The NAV component, when executed by the set of one or more processors, causes the network device to receive a first Physical Layer Protocol Data Unit (PPDU) from an Access Point (AP), where the first PPDU elicits an immediate response from the STA, determine whether the NAV maintained by the STA was previously set using a duration indicated in a second PPDU that originated from a same Basic Service Set (BSS) as a BSS that the STA is associated with, and transmit a third PPDU to the AP as an immediate response to the first PPDU without regard for the NAV maintained by the STA in response to a determination that the NAV maintained by the STA was previously set using the duration indicated in the second PPDU.

BRIEF DESCRIPTION OF THE DRAWINGS

Embodiments are illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 2A is a diagram illustrating a scenario where an AP sets its NAV when it is unable to successfully decode a payload portion of a UL MU PPDU, according to some embodiments.

FIG. 2B is a diagram illustrating a scenario where an AP sets its NAV when there is a payload error in an ACK frame or Block ACK frame, according to some embodiments.

FIG. 3C is a diagram illustrating a scenario where an AP refrains from setting its NAV when there is a payload error in a compressed beamforming frame, according to some embodiments.

FIG. 3D is a diagram illustrating a scenario where an AP refrains from setting its NAV when there is a payload error in compressed beamforming frames transmitted in MU manner, according to some embodiments.

DETAILED DESCRIPTION

Figure 1:
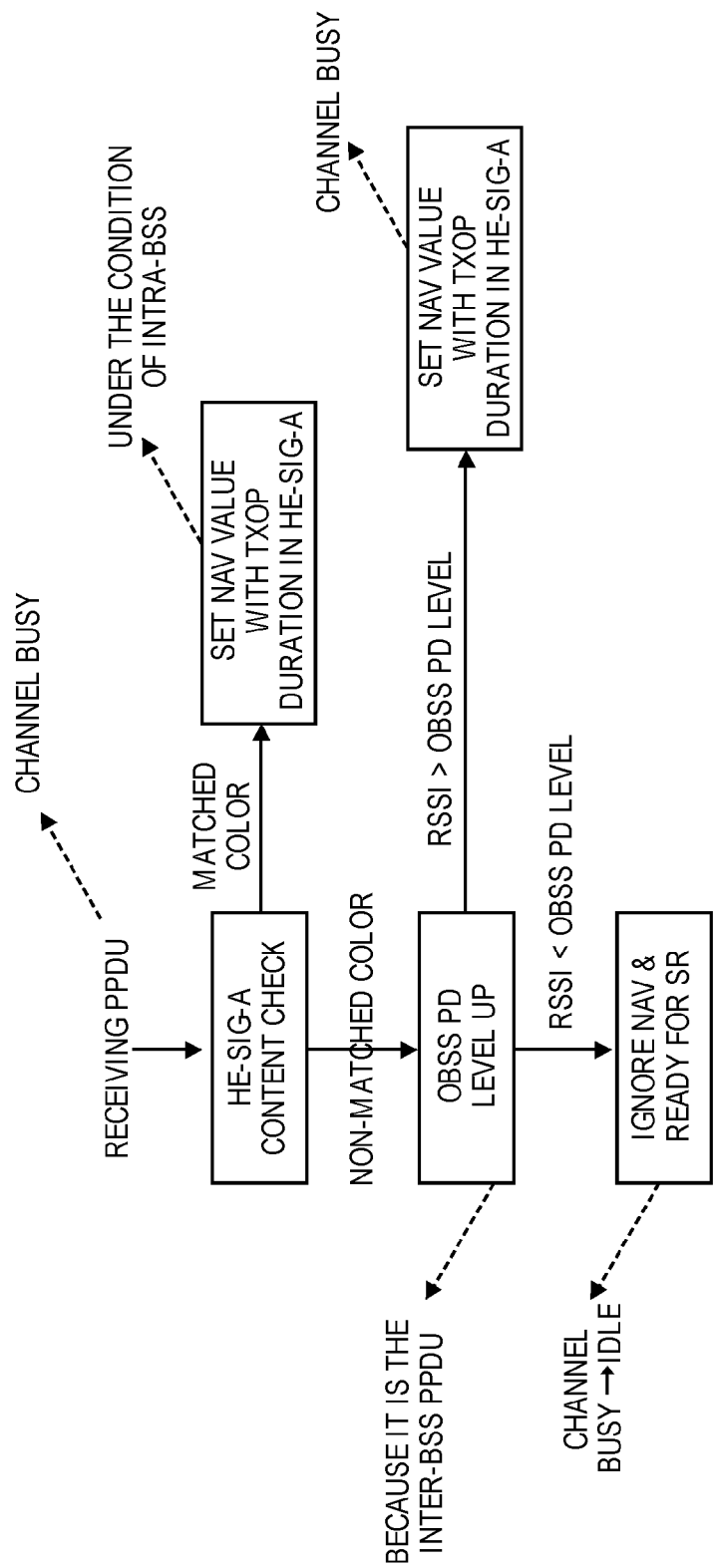
FIG. 1 is a flow diagram illustrating operations for setting a NAV, according to some embodiments.

The embodiments disclosed herein provide methods and apparatus for the maintenance and use of a Network Allocation Vector (NAV) in a High Efficiency (HE) Wireless Local Area Network (WLAN) that improves efficiency in the HE WLAN. An embodiment is a method implemented by a station (STA) in a WLAN. The method includes receiving a first Physical Layer Protocol Data Unit (PPDU), determining whether a duration indicated in a control field of a preamble portion of the first PPDU is greater than a current NAV value, determining whether the first PPDU is received as an immediate response to a second PPDU previously transmitted by the STA, and updating a NAV maintained by the STA using the duration indicated in the control field of the preamble portion of the first PPDU in response to a determination that the duration indicated in the control field of the preamble portion of the first PPDU is greater than the current NAV value and the first PPDU is not received as an immediate response to a second PPDU previously transmitted by the STA. Another embodiment is a method implemented by a STA in a WLAN. The method includes receiving a first PPDU from an Access Point (AP), where the first PPDU elicits an immediate response from the STA, determining whether a NAV maintained by the STA was previously set using a duration indicated in a second PPDU that originated from a same Basic Service Set (BSS) as a BSS associated with the STA, and transmitting a third PPDU to the AP as an immediate response to the first PPDU without regard for the NAV maintained by the STA in response to a determination that the NAV maintained by the STA was previously set using the duration indicated in the second PPDU. Other embodiments are also described and claimed.

In the following description, numerous specific details are set forth. However, it is understood that embodiments described herein may be practiced without these specific details. In other instances, well-known circuits, structures and techniques have not been shown in detail in order not to obscure the understanding of this description. It will be appreciated, however, by one skilled in the art that the embodiments described herein may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as non-transitory machine-readable media (e.g., machine-readable storage media such as magnetic disks, optical disks, read only memory, flash memory devices, phase change memory) and transitory machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set of one or more physical network interface(s) to establish network connections (to transmit code and/or data using propagating signals). Put another way, a typical electronic device includes memory comprising non-volatile memory (containing code regardless of whether the electronic device is on or off) and volatile memory (e.g., dynamic random access memory (DRAM), static random access memory (SRAM)), and while the electronic device is turned on that part of the code that is currently being executed is copied from the slower non-volatile memory into the volatile memory (often organized in a hierarchy) for execution by the processors of the electronic device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Network devices or network elements can include APs and non-AP STAs in wireless communications systems such as a WLAN. STAs are devices connected to and communicating in a WLAN including client or user devices that connect to the WLAN via APs. APs are network devices that may be specialized wireless access points that can communicate with other network devices in the WLAN via the wireless medium or via wired connections. APs may be considered to be a type of STA. A non-AP STA or AP may be referred to herein as a WLAN device or STA.

As mentioned above, in a task group called Institute of Electrical and Electronics Engineers (IEEE) 802.11ax, HE WLAN (HEW) standardization is under discussion. The HEW may support uplink (UL) and downlink (DL) multi-user (MU) simultaneous transmissions. In an MU simultaneous transmission, multiple frames are transmitted to or from multiple STAs simultaneously using different resources, where the different resources could be different frequency resources in the case of an Orthogonal Frequency Division Multiple Access (OFDMA) transmission or different spatial streams in the case of a Multi-User Multiple-Input Multiple Output (MU-MIMO) transmission. Examples of MU simultaneous transmission include DL-OFDMA, DL MU-MIMO, UL-OFDMA, and UL-MU-MIMO.

An AP may initiate a UL MU simultaneous transmission by transmitting a trigger frame (sometimes referred to as a UL-Poll frame) to a set of STAs that are to participate in the UL MU simultaneous transmission. The trigger frame may include information pertaining to the UL MU simultaneous transmission such as the assignment of transmission resources to STAs. Based on this information, the STAs may transmit their respective frames to the AP essentially simultaneously using an assigned transmission resource. If the AP successfully receives and decodes the uplink frames transmitted by the STAs, the AP may transmit acknowledgement (ACK) frames to the STAs.

The HEW may also support new Clear Channel Assessment (CCA) levels and deferral rules to improve Overlapping Basic Service Set (OBSS) operation in dense environments. For example, in one embodiment, when a STA receives a PPDU which results in that the STA determines the wireless medium is busy, the STA decodes the PPDU and checks the contents in the BSS color field of the HE-SIG-A field or the MAC address in the MAC header to determine whether the PPDU is an intra-BSS PPDU or an inter-BSS PPDU with respect to the STA. As used herein, a PPDU is an intra-BSS PPDU with respect to a STA if the PPDU originated from a WLAN device that is associated with the same BSS as the STA. As used herein, a PPDU is an inter-BSS PPDU with respect to a STA if the PPDU originated from a WLAN device that is associated with a different BSS than the STA. The STA may suspend the backoff countdown process during the time that is taken by the STA to determine whether the PPDU is an intra-BSS PPDU or an inter-BSS PPDU. If the STA determines that the received PPDU is an inter-BSS PPDU, the STA may use an OBSS Packet Detection (PD) level that is greater than the minimum receive sensitivity level. If the Receive Signal Strength Indicator (RSSI) of the received PPDU is below the OBSS PD level, then the STA may determine that the wireless medium is available for use. However, if the RSSI of the received PPDU is above the OBSS PD level, then the STA may determine that the wireless medium is busy and set/update its NAV.

According to current 802.11 specification, NAV is typically set/updated using a duration indicated in a Physical Layer Service Data Unit (PSDU) (e.g., in MAC header). However, in some cases a STA may not be able to successfully decode a PSDU from a PPDU, and thus may not be able to obtain duration information. Embodiments described herein may overcome the problem described above by using the duration indicated in the TXOP duration field of the HE-SIG-A field of the preamble portion of the PPDU to set/update its NAV. The preamble portion of a PPDU is typically encoded using a lower Modulation Coding Scheme (MCS) than the payload portion (which includes a PSDU), and thus is more likely to be successfully decoded compared to the payload portion.

FIG. 1 is a flow diagram illustrating operations for setting/updating a NAV, according to some embodiments. When a STA (e.g., AP or non-AP STA) receives a PPDU which results in that the STA determines the wireless medium is busy, the STA decodes the PPDU and checks the contents of the HE-SIG-A field to determine whether the PPDU is an intra-BSS PPDU or an inter-BSS PPDU (e.g., by checking the BSS color field of the HE-SIG-A field). The STA may suspend the backoff countdown process during the time that is taken by the STA to determine whether the PPDU is an intra-BSS PPDU or an inter-BSS PPDU. The HE-SIG-A field may include an indication of a BSS color. The BSS color helps identify a BSS associated with the STA that transmitted the PPDU. If the BSS color indicated in the HE-SIG-A field matches the BSS color of the BSS associated with the receiving STA, the receiving STA regards the PPDU as an intra-BSS PPDU and sets/updates its NAV using the duration indicated in the TXOP duration field of the HE-SIG-A field, if this new NAV is greater than the existing NAV (e.g., current NAV value). If the BSS color indicated in the HE-SIG-A field does not match the BSS color of the BSS associated with the receiving STA, the receiving STA regards the PPDU as an inter-BSS PPDU and is allowed to adjust the OBSS PD level (e.g., to a predetermined level) according to a function of transmit power control. If the received power (e.g., RSSI) is less than the OBSS PD level, the receiving STA ignores its NAV. Then, the receiving STA determines that the wireless medium is idle and resumes backoff countdown process during Distributed Coordination Function (DCF) Interframe space (DIFS) period or Extended Interframe space (EIFS) period to be ready for spatial reuse (SR). If the received power is equal to or greater than the OBSS PD level, then the receiving STA sets/updates its NAV using the duration indicated in the TXOP duration field of the HE-SIG-A field, if this new NAV is greater than the existing NAV.

According to some embodiments, the above operations for setting/updating a NAV can be generalized as follows. When a STA (e.g., AP or non-AP STA) receives a PPDU, the STA determines whether the PPDU is an inter-BSS PPDU or an inter-BSS PPDU. This determination can be made based on BSS indication bits (e.g. BSS color bits) included in a control field of the PPDU. If the STA determines that the PPDU is an intra-BSS PPDU, the STA sets/updates its NAV using a duration indicated in the control field of the PPDU, if this new NAV is greater than the existing NAV. However, if the STA determines that the PPDU is an inter-BSS PPDU, the STA determines whether the received power (e.g., RSSI) is less than the OBSS PD level. If so, the STA ignores its NAV (and thus may use the wireless medium to transmit, given other conditions are met). However, if the STA determines that the received power is equal to or greater than the OBSS PD level, the STA sets/updates its NAV using the duration indicated in a duration field of a control field of the PPDU, if this new NAV is greater than the existing NAV. In one embodiment, the BSS indication bits are BSS color bits (e.g., in a BSS color field). In one embodiment, the control field is an HE-SIG-A field. In one embodiment, the duration field is a TXOP duration field.

According to current 802.11 specification, when a STA receives a frame where the MAC address indicated in the Receiver Address (RA) field of the MAC header matches the MAC address of the STA, the STA does not set/update its NAV. However, for all other received frames (where the MAC address indicated in the RA field does not match the MAC address of the STA or where the STA does not successfully decode the payload), the STA sets/updates its NAV using the duration indicated in the PSDU, if this new NAV is greater than the existing NAV. In some cases, the STA is unable to successfully decode the payload (e.g., PSDU) of the PPDU and thus the STA may not be able to obtain the MAC address indicated in the RA field of the MAC header. This may cause the STA to set/update its NAV even when the STA is the intended recipient of the PPDU, which can result in inefficient operation in a WLAN (e.g., HEW), as described below.

FIG. 2A is a diagram illustrating a scenario where an AP sets/updates its NAV when it is unable to successfully decode a payload portion of a UL MU PPDU, according to some embodiments. For illustration purposes, the operations in this diagram and some of the other diagrams will be described in the context of a simple WLAN (e.g., HEW) that includes an AP and one or more non-AP STAs (e.g., STA1, STA2, STA3, and STA4). It should be understood, however, that the principles and concepts described herein are not limited thereto. Also, for sake of simplicity and clarity, ACK and/or Block ACK procedures may be omitted from the diagrams when they are not necessary for understanding the principles and concepts described herein. In this exemplary scenario shown in FIG. 2A, the AP attempts to receive UL frames from four STAs (e.g., STA1, STA2, STA3, and STA4) within a TXOP. The AP transmits a Request to Send (RTS) frame that elicits Clear to Send (CTS) frames from the four STAs and then receives CTS frames from the respective STAs as part of a UL MU simultaneous transmission. The exchange of the RTS frame and the CTS frames helps avoid any hidden node problems.

The AP then transmits a trigger frame to STA1 and STA2 that elicits an UL MU simultaneous transmission from those STAs. In response, STA1 and STA2 transmit an UL MU PPDU to the AP, where the UL MU PPDU includes a preamble portion and a payload portion. In this example, the AP is able to successfully decode the preamble portion, but is unable to successfully decode the payload portion of the UL MU PPDU due to an error. As such, the AP is unable to obtain information included in the RA field and the Transmitter Address (TA) field. In this example, the BSS color indicated in the preamble portion of the UL MU PPDU matches the BSS color of the BSS associated with the AP. Thus, following current rules, the AP may set/update its NAV using the duration indicated in the preamble portion of the UL MU PPDU. However, this is not an intended procedure since the AP is the intended recipient of the UL MU PPDU.

A similar problem can occur when there is a payload error in an ACK frame or Block ACK (BA) frame. For example, as shown in FIG. 2B, following an exchange of RTS and CTS frames, the AP transmits a data frame to STA1. In response, STA1 transmits an ACK/BA frame to the AP. However, in this example, due to a payload error, the AP is unable to obtain information included in the RA/TA fields of the ACK/BA frame (e.g., AP is only able to successfully decode the preamble portion of the PPDU that includes the ACK/BA frame). As a result, the AP may not know that the ACK/BA frame is intended for itself. As such, the AP may set/update its NAV, which is not the intended procedure.

Figure 2C:
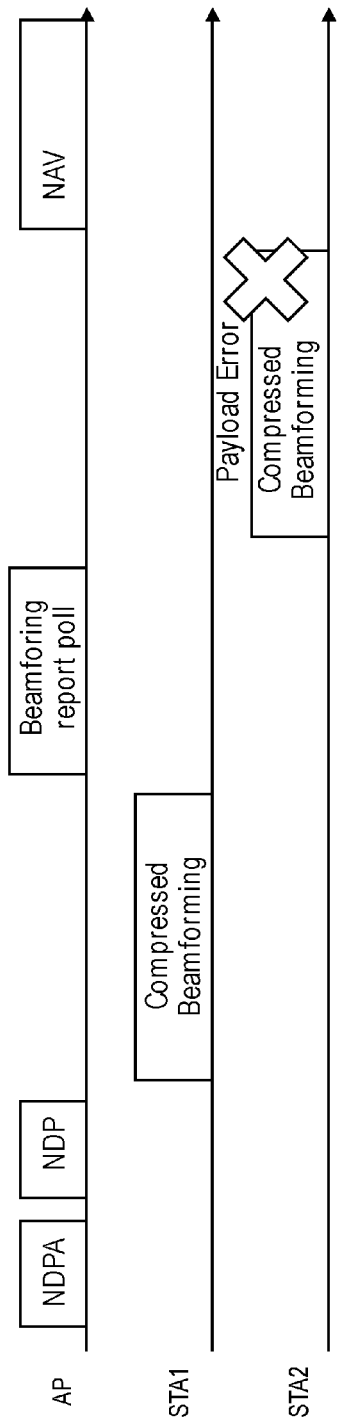
FIG. 2C is a diagram illustrating a scenario where an AP sets its NAV when there is a payload error in a compressed beamforming frame, according to some embodiments.
Figure 2D:
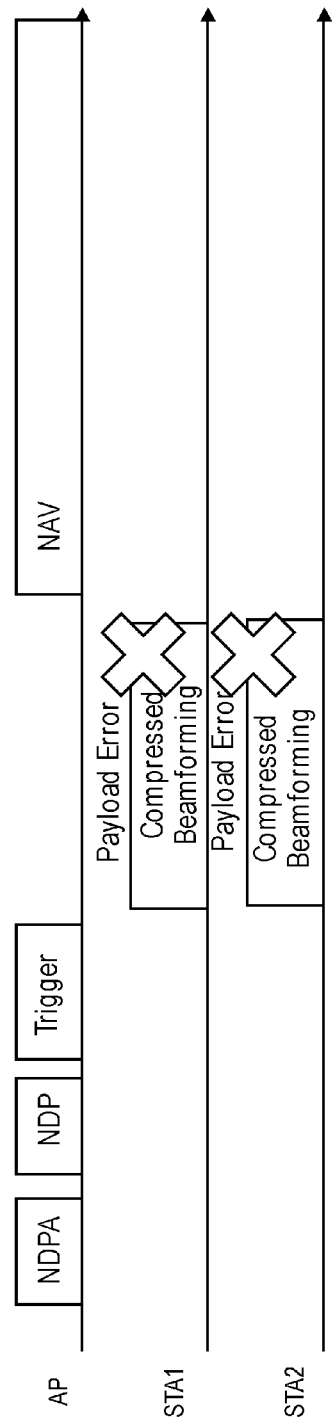
FIG. 2D is a diagram illustrating a scenario where an AP sets its NAV when there is a payload error in compressed beamforming frames transmitted in MU manner, according to some embodiments.

A similar problem can also occur during a Channel State Information (CSI) feedback procedure (commonly referred to as a sounding procedure). As shown in FIG. 2C, the AP (which is the beamformer in this example) initiates a sounding procedure by transmitting a Non-Data Packet Announcement (NDPA) followed by a Non-Data Packet (NDP). In response, STA1 (which is a beamformee in this example) transmits a compressed beamforming frame to the AP. The AP then transmits a beamforming report poll frame, which causes STA2 (which is another beamformee in this example) to transmit a compressed beamforming frame to the AP. However, in this example, due to a payload error, the AP is unable to obtain information included in the RA/TA fields of this compressed beamforming frame (e.g., AP is only able to successfully decode the preamble portion of the PPDU that includes this compressed beamforming frame). As a result, the AP may not know that this compressed beamforming frame is intended for itself. As such, the AP may set/update its NAV, which is not the intended procedure. In some cases, as shown in FIG. 2D, multiple STAs can transmit their respective compressed beamforming frames to the AP simultaneously as part of a UL MU simultaneous transmission (e.g., UL OFDMA or UL MU-MIMO transmissions) after receiving a trigger frame from the AP that facilitates resource assignment among STAs such that transmissions do not overlap in the frequency domain and/or spatial domain. In this example, due to a payload error, the AP is unable to obtain information included in the RA/TA fields of these compressed beamforming frames. As a result, the AP may not know that the compressed beamforming frames are intended for itself. As such, the AP may set/update its NAV, which is not the intended procedure.

Embodiments described herein may overcome the problems described above by having the AP refrain from setting/updating its NAV when the AP is unable to successfully decode the payload portion of a PPDU if the AP determines that the PPDU is received as a response to a PPDU previously transmitted by the AP. In one embodiment, the AP may determine that the PPDU was received as a response to a PPDU previously transmitted by the AP if the PPDU is received a given Interframe Space (xIFS—e.g., Short Interframe Space (SIFS)) time after transmitting the initial PPDU and/or based on one or more characteristics of the received PPDU.

According to some embodiments, operations for setting/updating a NAV can be as follows. When a STA (e.g., AP or non-AP STA) receives a PPDU, the STA determines whether the MAC address indicated in the RA field of the MAC header matches the MAC address of the STA. If so, the STA determines that the STA is an intended recipient of the UL MU PPDU. Accordingly, the STA does not set/update its NAV. However, if the STA determines that the MAC address indicated in the RA field of the MAC header does not match the MAC address of the STA, the STA determines that the PPDU is not an intended recipient and sets or updates its NAV.

The STA determines that the PPDU is an intra-BSS PPDU when BSS color indicated by BSS indication bits in a control field of the PPDU matches the BSS color of the BSS that the STA is associated with, and in this case, the STA may update its NAV using a duration indicated in the control field of the PPDU, if this new NAV is greater than the existing NAV, unless certain conditions apply. For example, in one embodiment, the STA does not set or update its NAV if the STA determines that the PPDU was received as a response to a PPDU previously transmitted by the STA. In one embodiment, the STA may determine that the PPDU is received as a response to a PPDU previously transmitted by the STA if the PPDU is received xIFS time after transmitting the initial PPDU.

The STA determines that the PPDU is an inter-BSS PPDU when BSS color indicated by BSS indication bits in the control field of the PPDU does not match the BSS color of the BSS that the STA is associated with, and in this case, the STA determines whether the received power (e.g., RSSI) is less than the OBSS PD level. If so, the STA ignores its existing NAV (and thus may use the wireless medium to transmit, given other conditions are met). However, if the STA determines that the received power is equal to or greater than the OBSS PD level, the STA updates its NAV using the duration indicated in a duration field of a control field of the PPDU, if this new NAV is greater than the existing NAV.

In one embodiment, the received PPDU includes a UL data frame (e.g., MU or Single-User (SU)) (e.g., as shown in FIG. 2A). In one embodiment, the received PPDU includes an ACK or BA frame (e.g., as shown in FIG. 2B). In one embodiment, the received PPDU includes a compressed beamforming frame (e.g., as shown in FIG. 2C and 2D). In one embodiment, the BSS indication bits are BSS color bits (e.g., in a BSS color field). In one embodiment, the control field is an HE-SIG-A field. In one embodiment, the duration field is a TXOP duration field. In one embodiment, xIFS is SIFS.

In one embodiment, an AP can determine that a PPDU is received as an immediate response to a trigger frame previously transmitted by the AP based on information included in the L-SIG field (e.g. the length of the received PPDU) or HE-SIG-A field (e.g., UL/DL, BSS color, bandwidth, etc.) of the received PPDU. Since the AP may have specified the various parameters pertaining to the UL MU simultaneous transmission (that the STAs should follow) in the trigger frame, the AP may have some idea regarding the expected characteristics of the response. Based on the above information, the AP may determine that the received PPDU is received as an immediate response to the trigger frame without having the information in the TA/RA fields of the PPDU.

In one embodiment, an AP can determine that a PPDU is received as an immediate response to a frame previously transmitted by the AP based on information included in the L-SIG field (e.g., the length of the received PPDU) or HE-SIG-A field (e.g., uplink/downlink, BSS color, bandwidth, etc.) of the received PPDU. For example, the AP may have some idea regarding the expected characteristics and length of the ACK frame. Based on the above information, the AP may determine that the received PPDU includes an ACK frame that is an immediate response to the previously transmitted frame without having the information in the TA/RA fields of the PPDU.

In one embodiment, an AP can determine that a PPDU is received as an immediate response to a beamforming report poll frame previously transmitted by the AP based on information included in the L-SIG field (e.g., the length of the received PPDU) or HE-SIG-A field (e.g., uplink/downlink, BSS color, bandwidth, etc.) of the received PPDU. For example, the AP may have some idea regarding the expected characteristics and length of the compressed beamforming frame. Based on the above information, the AP may determine that the received PPDU includes a compressed beamforming frame that is received as an immediate response to the beamforming report poll frame without having the information in the TA/RA fields of the PPDU.

Figure 3A:
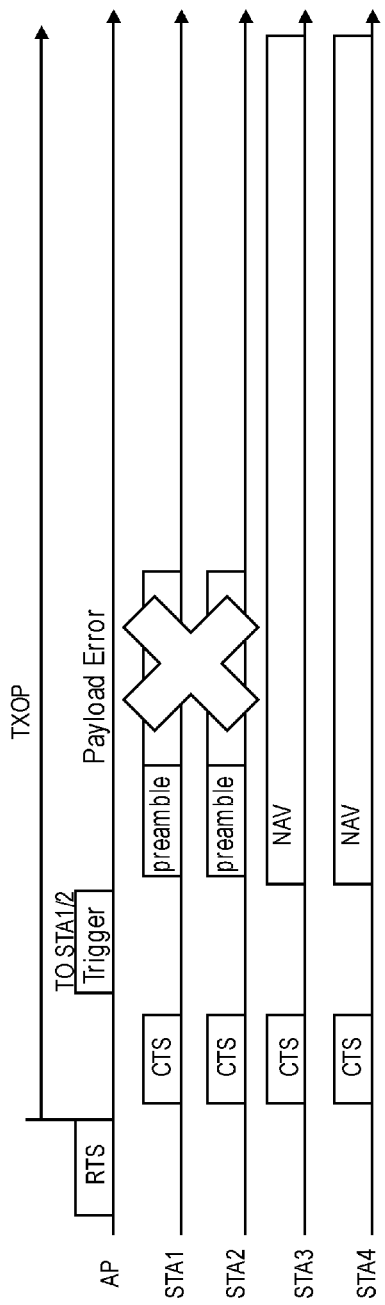
FIG. 3A is a diagram illustrating a scenario where an AP refrains from setting its NAV when it is unable to successfully decode a payload portion of a UL MU PPDU, according to some embodiments.

With the NAV setting operations described above, the AP may avoid unnecessarily setting/updating its NAV. For example, as shown in FIG. 3A, which corresponds to the scenario described with reference to FIG. 2A, when the AP receives the UL MU PPDU but is unable to successfully decode the payload portion of the UL MU PPDU, the AP may refrain from setting/updating its NAV since the AP may recognize that the UL MU PPDU is received as an immediate response to the trigger frame that the AP previously transmitted (e.g., based on the UL MU PPDU being received xIFS time after transmitting the trigger frame and/or based on one or more characteristics of the UL MU PPDU).

Figure 3B:
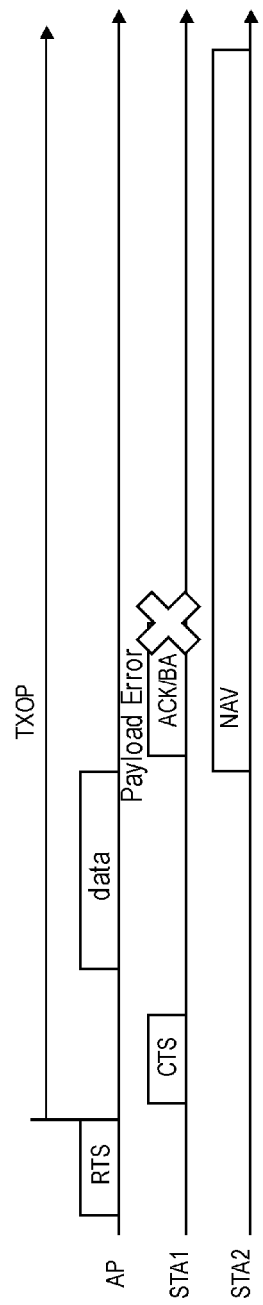
FIG. 3B is a diagram illustrating a scenario where an AP refrains from setting its NAV when there is a payload error in an ACK frame or Block ACK frame, according to some embodiments.

Similarly, as shown in FIG. 3B, which corresponds to the scenario described with reference to FIG. 2B, when the AP receives the ACK/BA frame but is unable to successfully decode the payload portion of the ACK/BA frame, the AP may refrain from setting/updating its NAV since the AP may recognize that the ACK/BA frame is received as an immediate response to the data frame that the AP previously transmitted.

Similarly, as shown in FIG. 3C, which corresponds to the scenario described with reference to FIG. 2C, when the AP receives the compressed beamforming frame but is unable to successfully decode the payload portion of the compressed beamforming frame, the AP may refrain from setting/updating its NAV since the AP may recognize that the compressed beamforming frame is received as an immediate response to the beamforming report poll frame that the AP previously transmitted.

Similarly, as shown in FIG. 3D, which corresponds to the scenario described with reference to FIG. 2D, when the AP receives the compressed beamforming frames but is unable to successfully decode the payload portion of these compressed beamforming frames, the AP may refrain from setting/updating its NAV since the AP may recognize that these compressed beamforming frames are received as an immediate response to the trigger frame that the AP previously transmitted.

Figure 4:
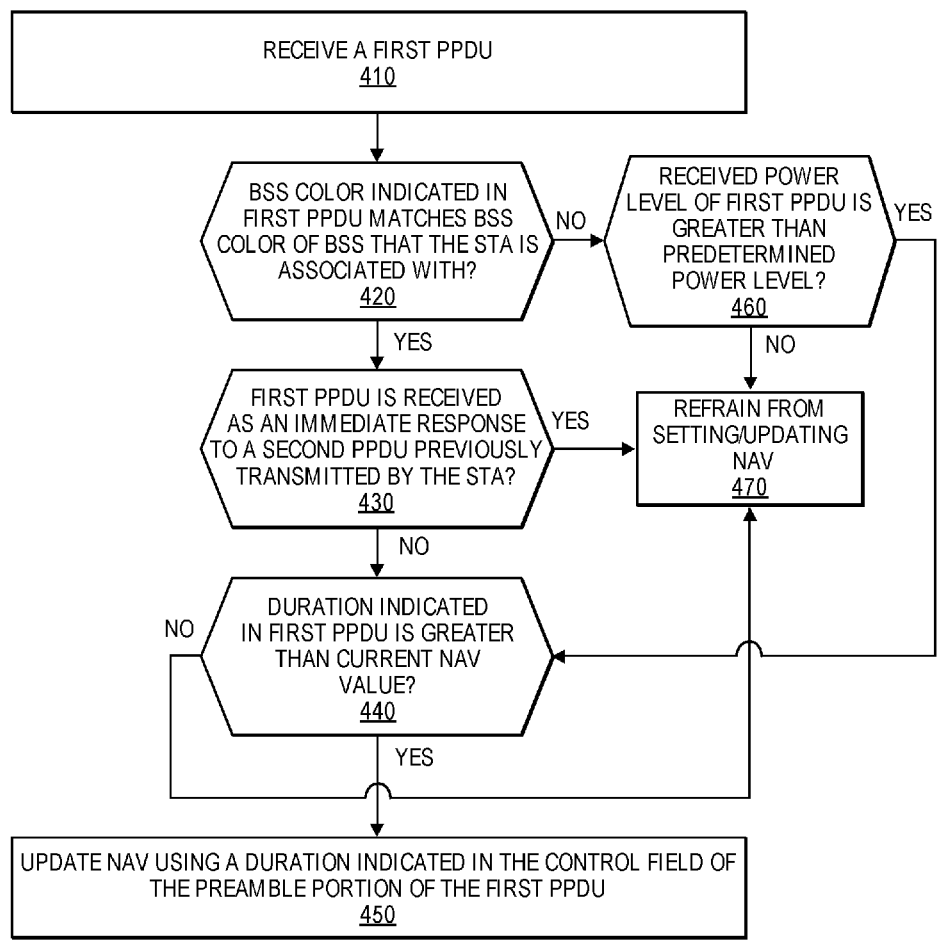
FIG. 4 is a flow diagram of a process for maintaining a NAV, according to some embodiments.

FIG. 4 is a flow diagram of a process for maintaining a NAV, according to some embodiments. In one embodiment, the operations of the flow diagram may be performed by a network device functioning as a STA (e.g., AP or non-AP STA) in a wireless communications network (e.g., a WLAN). The operations in this flow diagram and other flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

In one embodiment, the process is initiated when the STA receives a first PPDU, where the STA is unable to (successfully) decode a payload portion of the first PPDU (block 410). Although the STA is unable to successfully decode the payload portion of the first PPDU, the STA may be able to successfully decode the preamble portion of the first PPDU.

The STA determines whether the BSS color indicated in the control field of the preamble portion of the first PPDU matches the BSS color of the BSS that the STA is associated with (decision block 420). If so (e.g., first PPDU is an intra-BSS PPDU with respect to the STA), the STA determines whether the first PPDU is received as an immediate response to a second PPDU previously transmitted by the STA (decision block 430). In one embodiment, the STA determines whether the first PPDU is received as an immediate response to the second PPDU previously transmitted by the STA based on a determination of whether the first PPDU is received a SIFS time after transmitting the second PPDU. For example, if the first PPDU is received a SIFS time after transmitting the second PPDU, the STA may determine that the first PPDU is received as an immediate response to the second PPDU. In one embodiment, the STA determines whether the first PPDU is received as an immediate response to the second PPDU previously transmitted by the STA based on one or more indications included in an L-SIG field or HE-SIG-A field (e.g. BSS color) of the preamble portion of the first PPDU. For example, the STA may have some idea regarding the expected characteristics and length of the type of frame that it should receive in response to transmitting the second PPDU. Based on the above information (e.g., length of the first PPDU or expected response and indications included in the L-SIG/SIG-A fields), the STA may determine that the received PPDU (e.g., the first PPDU) is an immediate response to the second PPDU without having the information in the TA/RA fields of the second PPDU. In one embodiment, the second PPDU previously transmitted by the STA includes trigger information that elicits an immediate response from one or more other STAs.

If the STA determines that the first PPDU is received as an immediate response to the second PPDU previously transmitted by the STA, the AP refrains from setting/updating a NAV maintained by the STA (block 470). However, if the STA determines that the first PPDU is not received as an immediate response to the second PPDU previously transmitted by the STA, the STA determines whether the duration indicated in the control field of the preamble portion of the first PPDU is greater than a current NAV value (decision block 440). If so, the STA updates the NAV maintained by the STA using the duration indicated in the control field of the preamble portion of the first PPDU (block 450). In one embodiment, the duration is indicated in a TXOP duration field of the control field of the preamble portion of the first PPDU. In one embodiment, the control field of the preamble portion of the first PPDU is an HE-SIG-A field.

Returning to decision block 420, if the STA determines that the BSS color indicated in the first PPDU does not match the BSS color of the BSS that the STA is associated with (e.g., first PPDU is an inter-BSS PPDU with respect to the STA), then the STA determines whether the received power level of the first PPDU is greater than a predetermined power level (decision block 460). If the received power level is not greater than the predetermined power level, then the STA refrains from setting/updating the NAV maintained by the STA (block 470).

In this case, the STA may determine that the wireless medium is idle for transmitting a PPDU (e.g., ready for SR). However, if the received power level is greater than the predetermined power level, then the STA updates the NAV maintained by the STA using the duration indicated in the control field of the preamble portion of the first PPDU (block 450) when the duration is greater than the current NAV value (see decision block 440). In one embodiment, the predetermined power level is an OBSS PD level.

As previously mentioned, an AP may initiate a UL MU simultaneous transmission by transmitting a trigger frame to a set of STAs that are to participate in the UL MU simultaneous transmission. The AP may initiate multiple UL MU simultaneous transmission within a given TXOP by transmitting multiple trigger frames within the TXOP, where different trigger frames may elicit UL MU simultaneous transmission from different sets of STAs. For example, the first trigger frame may elicit UL MU simultaneous transmission from STA1 and STA2 , the second trigger frame may elicit UL MU simultaneous transmission from STA3 and STA4 , and the third trigger frame may elicit UL MU simultaneous transmission from STA3 , STA4 , and STA5.

According to current 802.11 specification, a STA that receives a trigger frame that elicits the STA to participate in a UL MU simultaneous transmission considers its NAV when determining whether to respond to the trigger frame unless one of the following conditions is met: 1) NAV was set by a frame originating from the AP that transmitted the trigger frame; and 2) the response includes ACK/BA frame and the duration of the UL MU simultaneous transmission is below a predetermined threshold. In some cases, the STA may have set its NAV based on receiving a PPDU which has a payload error (e.g., and thus the STA is unable to obtain information from TA/RA fields). In these cases, following current rules, the STA may consider its NAV when it decides whether to respond to a trigger frame that elicits the STA to participate in a UL MU simultaneous transmission. This can result in inefficient operation in a WLAN (e.g., HEW), as described below.

Figure 5:
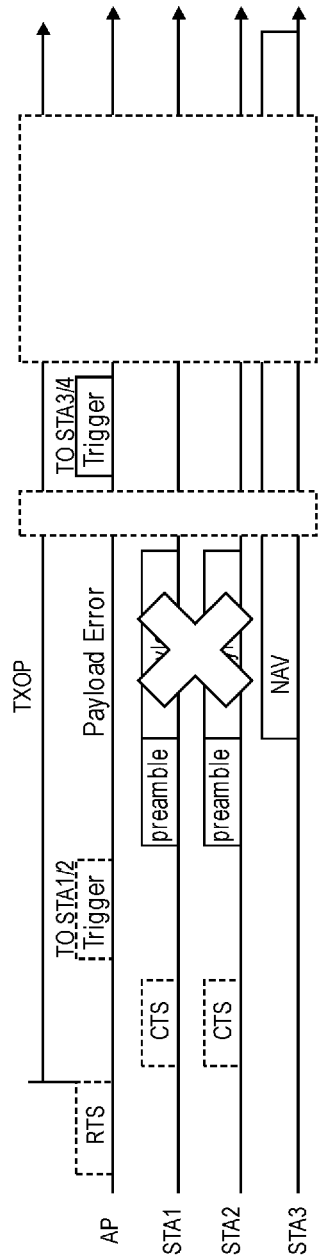
FIG. 5 is a diagram illustrating a scenario where a STA does not respond to a trigger frame due to its NAV being set, according to some embodiments.

FIG. 5 is a diagram illustrating a scenario where a STA does not respond to a trigger frame due to its NAV being set, according to some embodiments. In this exemplary scenario, the AP transmits an RTS frame to STA1 and STA2 . The AP then receives CTS frames from STA1 and STA2 as part of a UL MU simultaneous transmission. The exchange of the RTS and CTS frames helps avoid any hidden node problems.

The AP then transmits a trigger frame to STA1 and STA2 that elicits an UL MU simultaneous transmission from those STAs. In response, STA1 and STA2 transmit an UL MU PPDU to the AP, where the UL MU PPDU includes a preamble portion and a payload portion. In this example, STA3 does not detect the RTS frame, the CTS frames, or the trigger frame or STA3 detects the RTS frame, the CTS frames, or the trigger frame incorrectly. STA3 is able to successfully decode the preamble portion of the UL MU PPDU, but is unable to successfully decode the payload portion of the UL MU PPDU due to an error. As such, STA3 is unable to obtain information included in the RA/TA fields. STA3 may thus set its NAV using the duration indicated in the preamble portion of the UL MU PPDU. The AP may then transmit a trigger frame to STA3 and STA4 that elicits an UL MU simultaneous transmission from those STAs. However, STA3 may not respond to this trigger frame due to its NAV being set. This is not an intended procedure.

To address this problem, in one embodiment, when a STA receives a PPDU that elicits a UL MU simultaneous transmission from the STA (e.g., the PPDU includes a trigger frame or trigger information), the STA responds to the PPDU after xIFS time without regard to its NAV if its NAV was set using a duration indicated in a duration field of a control field of an intra-BSS PPDU originating from an unknown source. The source could be unknown to the STA because the STA is unable to successfully decode the payload portion of the PPDU (and more specifically, the TA/RA fields of the MAC header). However, the STA may determine that the PPDU is an intra-BSS PPDU based on successfully decoding the preamble portion of the PPDU, which may include an indication of the BSS color. In one embodiment, the PPDU that elicits the UL MU simultaneous transmission from the STA includes a trigger frame. In one embodiment, the duration field is a TXOP duration field of the control field. In one embodiment, the control field is an HE-SIG-A field. In one embodiment, the unknown source can be a non-TXOP holder.

Figure 6:
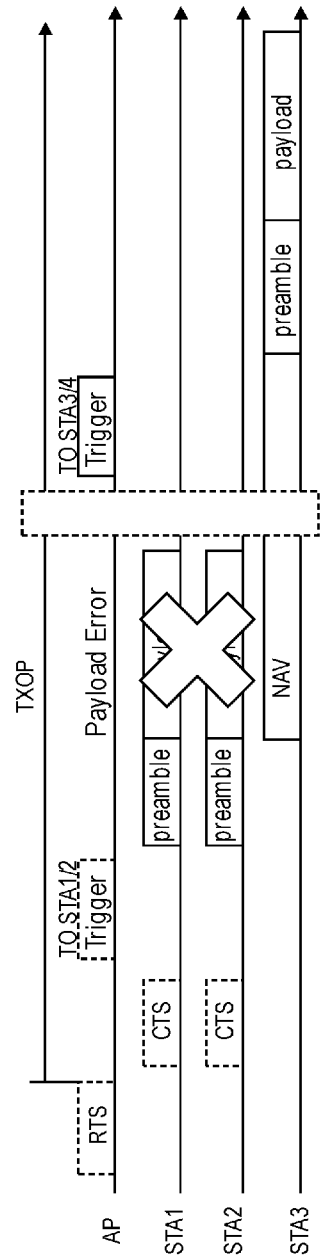
FIG. 6 is a diagram illustrating a scenario where a STA responds to a trigger frame without regard to its NAV, according to some embodiments.

For example, as shown in FIG. 6, which corresponds to the scenario described with reference to FIG. 5, when STA3 receives the second trigger frame, STA3 responds by transmitting a UL MU PPDU without regard to its NAV because its NAV was set using a duration indicated in a PPDU originating from an unknown source (e.g., source of initial UL MU PPDU is unknown to STA3 due to STA3 not being able to successfully decode the payload portion of the initial UL MU PPDU).

Figure 7:
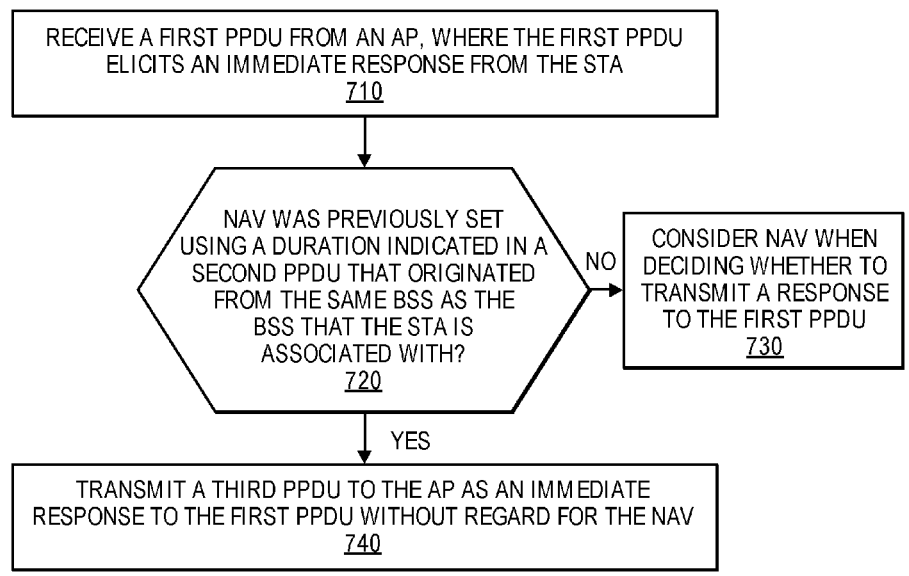
FIG. 7 is a flow diagram of a process for using a NAV, according to some embodiments.

FIG. 7 is a flow diagram of a process for using a NAV, according to some embodiments. In one embodiment, the operations of the flow diagram may be performed by a network device functioning as a non-AP STA in a wireless communications network (e.g., a WLAN).

In one embodiment, the process is initiated when the STA receives a first PPDU from an AP, where the first PPDU elicits an immediate response from the STA (block 710). In one embodiment, the first PPDU includes trigger information (e.g., a trigger frame) that elicits the STA to participate in a UL MU simultaneous transmission.

The STA determines whether a NAV maintained by the STA was previously set using a duration indicated in a second PPDU that originated from the same BSS as the BSS that the STA is associated with (block 720). The STA may have determined that the second PPDU originated from the same BSS as the BSS that the STA is associated with based on determining that the BSS color indicated in the preamble portion of the second PPDU (e.g., in the control field of the preamble portion of the second PPDU) matches the BSS color of the BSS associated with the STA even if the STA was unable to successfully decode the payload portion of the second PPDU. If the STA determines that the NAV maintained by the STA was not previously set using the duration indicated in the second PPDU that originated from the same BSS as the BSS that the STA is associated with, the STA considers NAV when deciding whether to transmit a response to the first PPDU, given that other conditions for ignoring NAV do not apply (block 730). However, if the STA determines that the NAV maintained by the STA was previously set using the duration indicated in the second PPDU that originated from the same BSS as the BSS that the STA is associated with, the STA transmits a third PPDU to the AP as an immediate response to the first PPDU without regard for the NAV maintained by the STA (block 740). In one embodiment, the duration is indicated in a TXOP duration field of an HE-SIG-A field of a preamble portion of the second PPDU. In one embodiment, the STA transmits the third PPDU to the AP a SIFS time after receiving the first PPDU.

Figure 8:
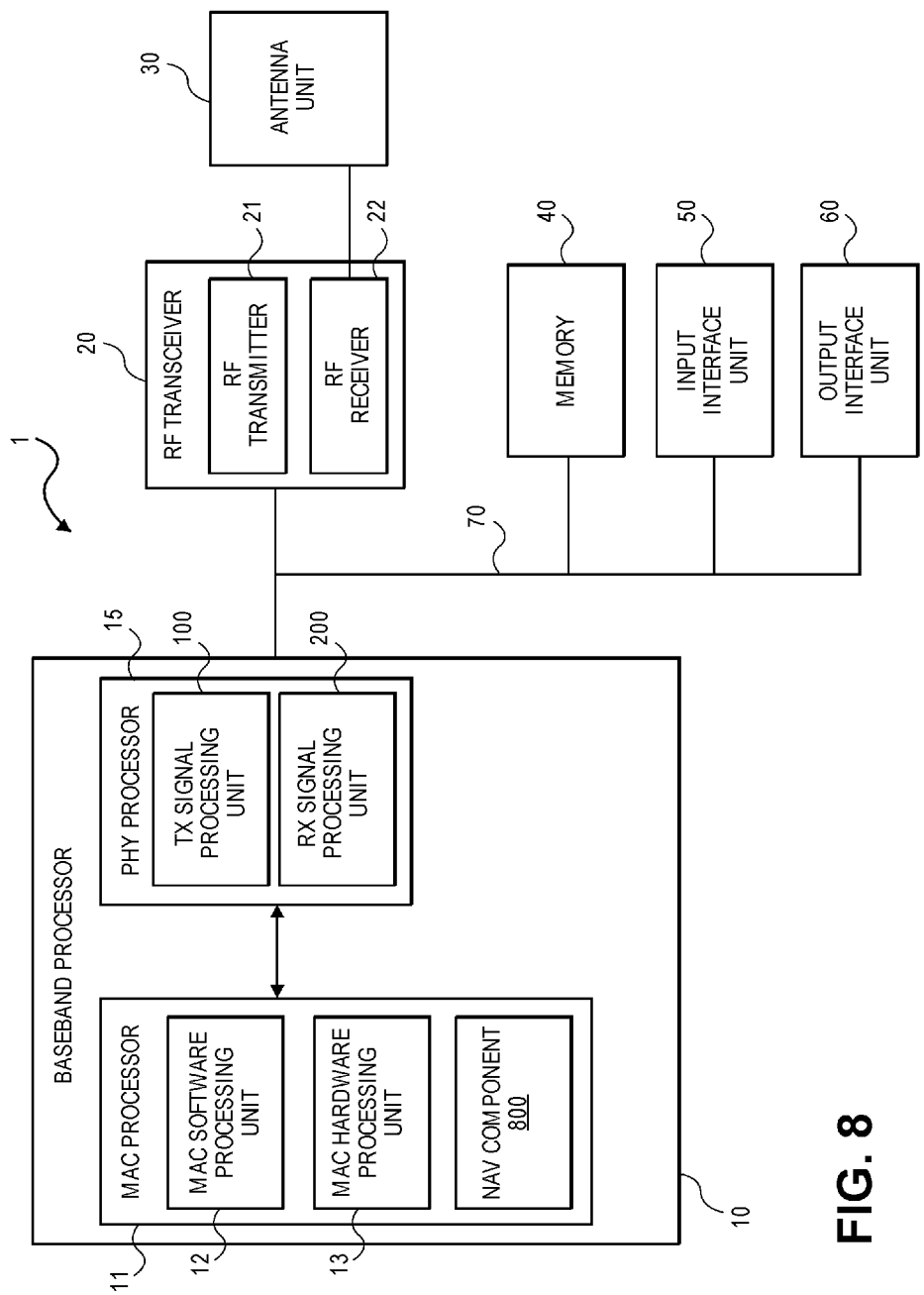
FIG. 8 is a block diagram of a network device implementing a STA or AP that executes a NAV component, according to some embodiments.
Figure 9:
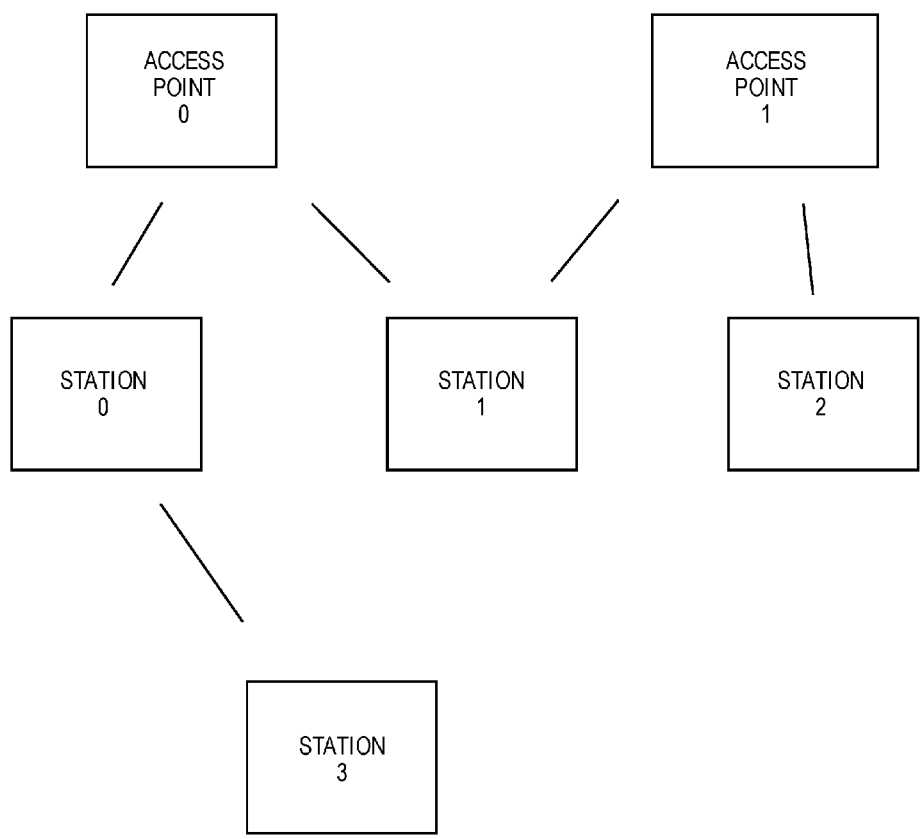
FIG. 9 is a block diagram of a WLAN, according to some embodiments.

FIG. 8 is a block diagram of a network device implementing a STA or AP that executes a NAV component, according to some embodiments. In a wireless local area network (WLAN) such as the example WLAN illustrated in FIG. 9, a basic service set (BSS) includes a plurality of network devices referred to herein as WLAN devices. Each of the WLAN devices may include a medium access control (MAC) layer and a physical (PHY) layer according to IEEE 802.11 standard. In the plurality of WLAN devices, at least one WLAN device may be an AP station (e.g., access point 0 and access point 1 in FIG. 9) and the other WLAN devices may be non-AP stations (non-AP STAs), (e.g., stations 0-3 in FIG. 9). Alternatively, all of the plurality of WLAN devices may be non-AP STAs in an Ad-hoc networking environment. In general, the AP STA and the non-AP STA may be each referred to herein as a station (STA). However, for ease of description, only the non-AP STA will be referred to herein as a STA whereas the AP stations are referred to herein as APs for ease of description. As shown in FIG. 9, a WLAN can have any combination of STAs and APs that can form a discrete network, an ad hoc network or any combination thereof. Any number of APs and STAs can be included in a WLAN and any topology and configuration of such APs and STAs in the network can be utilized.

The example WLAN device 1 includes a baseband processor 10, a radio frequency (RF) transceiver 20, an antenna unit 30, memory 40, an input interface unit 50, an output interface unit 60, and a bus 70. The baseband processor 10 performs baseband signal processing, and includes a MAC processor 11 and a PHY processor 15. These processors can be any type of integrated circuit (IC) including a general processing unit or an application specific integrated circuit (ASIC). In some embodiments, the MAC processor 11 also implements a NAV component 800. The NAV component 800 can implement the respective functions for any combination of the embodiments described herein above with regard to FIGS. 1-7. In other embodiments, the NAV component 800 may be implemented by or distributed over both the PHY processor 15 and the MAC processor 11. The NAV component 800 may be implemented as software or as hardware components of either the PHY processor 15 or MAC processor 11.

In one embodiment, the MAC processor 11 may include a MAC software processing unit 12 and a MAC hardware processing unit 13. The memory 40 may store software (hereinafter referred to as "MAC software"), including at least some functions of the MAC layer. The MAC software processing unit 12 executes the MAC software to implement some functions of the MAC layer and the MAC hardware processing unit 13 may implement the remaining functions of the MAC layer in hardware (hereinafter referred to "MAC hardware"). However, the MAC processor 11 is not limited to this distribution of functionality.

The PHY processor 15 includes a transmitting signal processing unit 100 and a receiving signal processing unit 200 described further herein below with reference to FIGS. 9 and 10.

The baseband processor 10, the memory 40, the input interface unit 50, and the output interface unit 60 may communicate with each other via the bus 70. The radio frequency (RF) transceiver 20 includes an RF transmitter 21 and an RF receiver 22. The memory 40 may further store an operating system and applications. In some embodiments, the memory may store recorded information about captured frames. The input interface unit 50 receives information from a user and the output interface unit 60 outputs information to the user.

The antenna unit 30 includes one or more antennas. When a MIMO or MU-MIMO system is used, the antenna unit 30 may include a plurality of antennas.

Figures 10, 11:
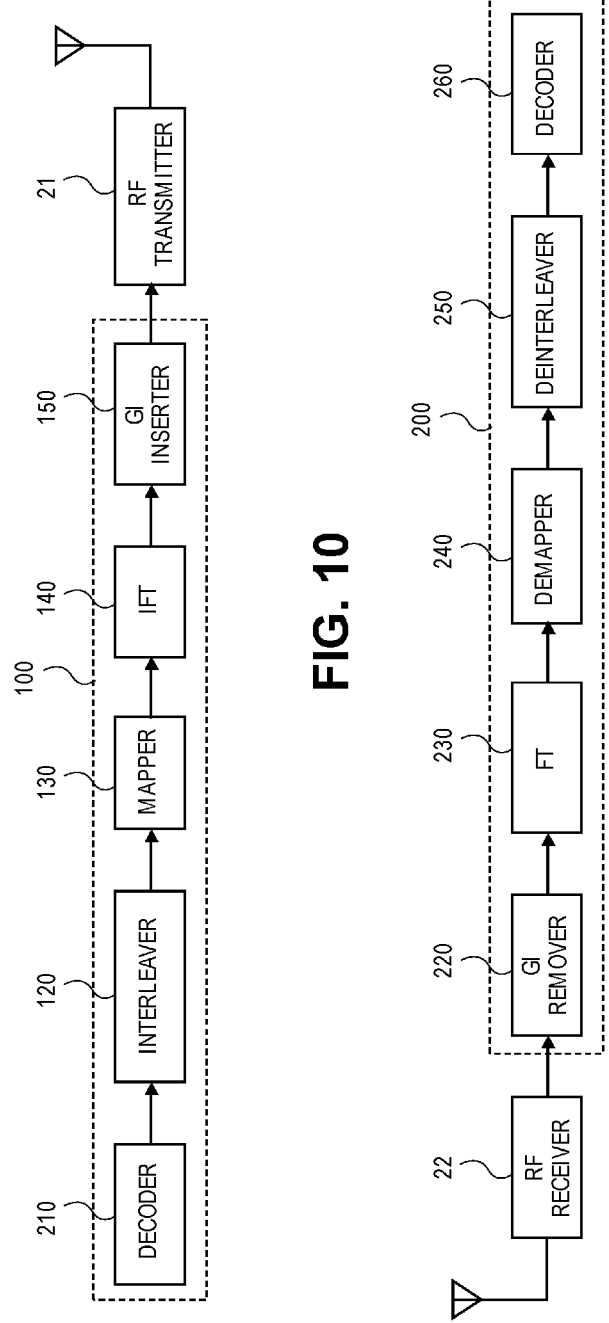
FIG. 10 is a schematic block diagram exemplifying a transmitting signal processor in a WLAN device, according to some embodiments.
FIG. 11 is a schematic block diagram exemplifying a receiving signal processing unit in a WLAN device, according to some embodiments.

FIG. 10 is a schematic block diagram exemplifying a transmitting signal processor in a WLAN device, according to some embodiments. Referring to the above drawing, a transmitting signal processing unit 100 includes an encoder 110, an interleaver 120, a mapper 130, an inverse Fourier transformer (IFT) 140, and a guard interval (GI) inserter 150. The encoder 110 encodes input data. For example, the encoder 110 may be a forward error correction (FEC) encoder. The FEC encoder may include a binary convolutional code (BCC) encoder followed by a puncturing device or may include a low-density parity-check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder to change the order of bits. Interleaving may be applied only when BCC encoding is used. The mapper 130 maps the sequence of bits output from the interleaver to constellation points. If LDPC encoding is used in the encoder 110, the mapper 130 may further perform LDPC tone mapping in addition to constellation mapping.

When multiple input—multiple output (MIMO) or multiple user (MU)-MIMO is used, the transmitting signal processing unit 100 may use a plurality of interleavers 120 and a plurality of mappers 130 corresponding to the number $N_{SS}$ of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When MIMO or MU-MIMO is used, the transmitting signal processing unit 100 may insert cyclic shift diversities (CSDs) to prevent unintentional beamforming. The CSD insertion may occur before or after the inverse Fourier transform 140. The CSD may be specified per transmit chain or may be specified per space-time stream. Alternatively, the CSD may be applied as a part of the spatial mapper. When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

FIG. 11 is a schematic block diagram exemplifying a receiving signal processing unit in the WLAN device, according to some embodiments. Referring to FIG. 11, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time domain block) into a block of constellation points by using a discrete Fourier transform (DFT) or a fast Fourier transform (FFT). The Fourier transformer 230 may be provided for each receive chain.

When MIMO or MU-MIMO is used, the receiving signal processing unit 200 may use a spatial demapper for converting the Fourier transformed receiver chains to constellation points of the space-time streams and an STBC decoder for despreading the constellation points from the space-time streams into the spatial streams.

The demapper 240 demaps the constellation points output from the Fourier transformer 230 or the STBC decoder to bit streams. If LDPC encoding is used, the demapper 240 may further perform LDPC tone demapping before constellation demapping. The deinterleaver 250 deinterleaves the bits of each stream output from the demapper 240. Deinterleaving may be applied only when BCC encoding is used.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 260 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

Figure 12:
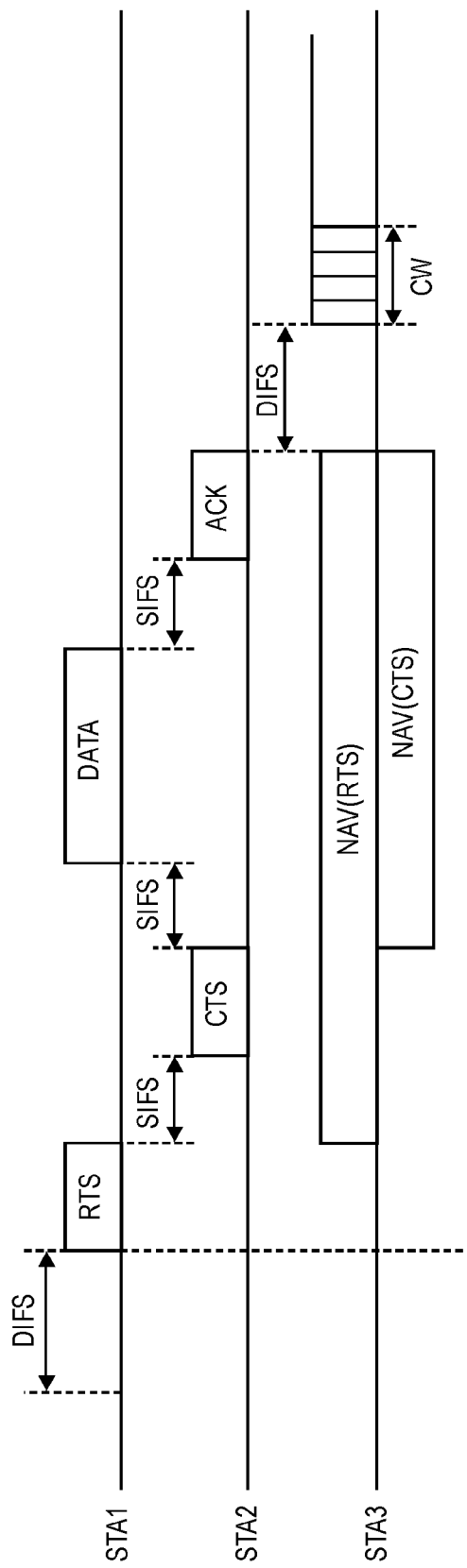
FIG. 12 is a timing diagram providing an example of the Carrier Sense Multiple Access/Collision Avoidance (CSMA/CA) transmission procedure, according to some embodiments.

FIG. 12 is a timing diagram providing an example of the Carrier Sense Multiple Access/Collision Avoidance (CSMA/CA) transmission procedure, according to some embodiments. In the illustrated example, STA1 is a transmit WLAN device for transmitting data, STA2 is a receive WLAN device for receiving the data, and STA3 is a WLAN device, which may be located at an area where a frame transmitted from the STA1 and/or a frame transmitted from the STA2 can be received by the WLAN device.

STA1 may determine whether the channel is busy by carrier sensing. The STA1 may determine the channel occupation based on a quality of the signal on the channel or correlation of signals in the channel, or may determine the channel occupation by using a NAV timer.

When determining that the channel is not used by other devices during DIFS (that is, the channel is idle), STA1 may transmit an RTS frame to STA2 after performing backoff. Upon receiving the RTS frame, STA2 may transmit a CTS frame as a response of the CTS frame after SIFS. When STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When STA3 receives the CTS frame, it may set the NAV timer for a transmission duration of subsequently transmitted frames (for example, a duration of SIFS+data frame duration+SIFS+ACK frame duration) by using duration information included in the CTS frame. Upon receiving a new frame before the NAV timer expires, STA3 may update the NAV timer by using duration information included in the new frame. STA3 does not attempt to access the channel until the NAV timer expires.

When STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, STA3 may determine whether the channel is busy through the use of carrier sensing techniques. Upon determining that the channel is not used by other devices during DIFS and after the NAV timer has expired, STA3 may attempt channel access after a contention window according to random backoff elapses.

A PHY-RXSTART.indication primitive is an indication by the physical layer (PHY) to the local MAC entity that the PHY has received a valid start of a PPDU, including a valid PHY header. This primitive is generated by the local PHY entity and provided to the MAC sublayer when the PHY has successfully validated a PHY header at the start of a new PPDU. This primitive provides the following parameters:

| |
| --- |
| PHY-RXSTART.indication(<br>RXVECTOR<br>) |

The RXVECTOR parameter represents a list of parameters that the local PHY entity provides to the local MAC entity upon receipt of a valid PHY header or upon receipt of the last PSDU data bit in a received frame. The RXVECTOR may include a TXOP_DURATION parameter that includes duration information.

After generating a PHY-RXSTART.indication primitive, the PHY is expected to maintain a physical medium busy status during the period that it takes for the PHY to transfer a frame of the indicated LENGTH at the indicated DATARATE. The physical medium busy status may be maintained even if a PHY-RXEND.indication(CarrierLost) primitive or a PHY-RXEND.indication(FormationViolation) primitive is generated by the PHY prior to the end of this period.

A PHY-RXEND.indication primitive is an indication by the PHY to the local MAC entity that the PSDU currently being received is complete. This primitive is generated by the local PHY entity and provided to the MAC sublayer to indicate that the receive state machine has completed a reception with or without errors. This primitive provides the following parameters:

| |
| --- |
| PHY-RXEND.indication(<br>RXERROR,<br>RXVECTOR<br>) |

The RXERROR parameter can convey one or more of the following values: NoError, FormatViolation, CarrierLost, Unsupported Rate and Filtered. A number of error conditions may occur after the PHY's receive state machine has detected what appears to be a valid preamble and Start Frame Delimiter (SFD). NoError is a value used to indicate that no error occurred during the receive process in the PHY. FormatViolation is a value used to indicate that the format of the received PPDU was in error. CarrierLost is a value used to indicate that the carrier was lost during the reception of the incoming PSDU and no further processing of the PSDU can be accomplished. UnsupportedRate is a value that is used to indicate that a non-supported data rate was detected during the reception of the incoming PPDU. Filtered is a value used to indicate that the incoming PPDU was filtered out during the reception of the incoming PPDU due to a condition set in the PHYCONFIG_VECTOR. In the case of an RXERROR value of NoError, the MAC may use the PHY-RXEND.indication primitive as a reference for channel access timing.

The RXVECTOR parameter represents a list of parameters that the local PHY entity provides to the local MAC entity upon receipt of a valid PHY header or upon receipt of the last PSDU data bit in a received frame. The RXVECTOR may include a TXOP_DURATION parameter that includes duration information. RXVECTOR may only be included when dot11RadioMeasurementActivated is true. This vector may contain both MAC and MAC management parameters.

The solutions provided herein have been described with reference to a wireless LAN system; however, it should be understood that these solutions are also applicable to other network environments, such as cellular telecommunication networks, wired networks, and similar communication networks.

An embodiment may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

While the flow diagrams in the figures herein show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a station (STA) in a Wireless Local Area Network (WLAN) to update a Network Allocation Vector (NAV) maintained by the STA, the method comprising:
   receiving a first Physical Layer Protocol Data Unit (PPDU), wherein the STA is able to decode a preamble portion of the first PPDU but unable to decode a payload portion of the first PPDU;
   determining whether a duration indicated in a control field of the preamble portion of the first PPDU is greater than a current NAV value;
   determining whether the first PPDU is received as an immediate response to a second PPDU previously transmitted by the STA;
   updating the NAV maintained by the STA using the duration indicated in the control field of the preamble portion of the first PPDU in response to a determination that the duration indicated in the control field of the preamble portion of the first PPDU is greater than the current NAV value and the first PPDU is not received as an immediate response to the second PPDU previously transmitted by the STA, wherein the STA is configured to refrain from updating the NAV maintained by the STA in response to a determination that the first PPDU is received as an immediate response to the second PPDU previously transmitted by the STA; and
   attempting to access the wireless medium after the NAV has expired, wherein the STA is configured to refrain from attempting to access the wireless medium before the NAV has expired.

2. The method of claim 1, further comprising:
   determining whether a Basic Service Set (BSS) color indicated in the control field of the preamble portion of the first PPDU matches a BSS color of a BSS that the STA is associated with, wherein the NAV maintained by the STA is updated using the duration indicated in the control field of the preamble portion of the first PPDU further in response to a determination that the BSS color indicated in the control field of the preamble portion of the first PPDU matches the BSS color of the BSS that the STA is associated with.

3. The method of claim 1, wherein the second PPDU previously transmitted by the STA includes trigger information that elicits an immediate response.

4. The method of claim 1, wherein the duration is indicated in a transmit opportunity (TXOP) duration field of the control field of the preamble portion of the first PPDU.

5. The method of claim 4, wherein the control field of the preamble portion of the first PPDU is a High Efficiency Signal A (HE-SIG-A) field.

6. The method of claim 1, further comprising:
   determining whether a received power level of the first PPDU is greater than a predetermined power level when a Basic Service Set (BSS) color indicated in the control field of the preamble portion of the first PPDU does not match a BSS color of a BSS that the STA is associated with; and
   updating the NAV maintained by the STA using the duration indicated in the control field of the preamble portion of the first PPDU in response to a determination that the received power level of the first PPDU is greater than the predetermined power level and the duration indicated in the control field of the preamble portion of the first PPDU is greater than the current NAV value.

7. The method of claim 6, further comprising:
determining that a wireless medium is idle for transmitting a third PPDU in response to a determination that the received power level of the first PPDU is less than the predetermined power level.

8. The method of claim 6, wherein the predetermined power level is Overlapping Basic Service Set Packet Detection (OBSS PD) level.

9. The method of claim 1, wherein determining whether the first PPDU is received as an immediate response to the second PPDU previously transmitted by the STA is based on a determination of whether the first PPDU is received a Short Interframe Space (SIFS) time after transmitting the second PPDU.

10. A network device to function as a station (STA) in a Wireless Local Area Network (WLAN) to update a Network Allocation Vector (NAV) maintained by the STA, the network device comprising:
a Radio Frequency (RF) transceiver;
a set of one or more processors; and
a non-transitory machine-readable medium having stored therein a NAV component, which when executed by the set of one or more processors, causes the network device to receive a first Physical Layer Protocol Data Unit (PPDU), wherein the STA is able to decode a preamble portion of the first PPDU but unable to decode a payload portion of the first PPDU, determine whether a duration indicated in a control field of the preamble portion of the first PPDU is greater than a current NAV value, determine whether the first PPDU is received as an immediate response to a second PPDU previously transmitted by the STA, update the NAV maintained by the STA using the duration indicated in the control field of the preamble portion of the first PPDU in response to a determination that the duration indicated in the control field of the preamble portion of the first PPDU is greater than the current NAV value and the first PPDU is not received as an immediate response to the second PPDU previously transmitted by the STA, wherein the STA is to refrain from updating the NAV maintained by the STA in response to a determination that the first PPDU is received as an immediate response to the second PPDU previously transmitted by the STA, and attempt to access the wireless medium after the NAV expires, wherein the STA is to refrain from attempting to access the wireless medium before the NAV has expired.

11. The network device of claim 10, wherein the NAV component, when executed by the set of one or more processors, further causes the network device to determine whether a Basic Service Set (BSS) color indicated in the control field of the preamble portion of the first PPDU matches a BSS color of a BSS that the STA is associated with, wherein the NAV maintained by the STA is updated using the duration indicated in the control field of the preamble portion of the first PPDU further in response to a determination that the BSS color indicated in the control field of the preamble portion of the first PPDU matches the BSS color of the BSS that the STA is associated with.

12. The network device of claim 10, wherein the second PPDU previously transmitted by the STA includes trigger information that elicits an immediate response.

13. The network device of claim 10, wherein the duration is indicated in a transmit opportunity (TXOP) duration field of the control field of the preamble portion of the first PPDU, wherein the control field of the preamble portion of the first PPDU is a High Efficiency Signal A (HE-SIG-A) field.

14. The network device of claim 10, wherein the NAV component, when executed by the set of one or more processors, further causes the network device to determine whether a received power level of the first PPDU is greater than a predetermined power level when a Basic Service Set (BSS) color indicated in the control field of the preamble portion of the first PPDU does not match a BSS color of a BSS that the STA is associated with and update the NAV maintained by the STA using the duration indicated in the control field of the preamble portion of the first PPDU in response to a determination that the received power level of the first PPDU is greater than the predetermined power level and the duration indicated in the control field of the preamble portion of the first PPDU is greater than the current NAV value.

* * * * *